(12) United States Patent
Kreiner et al.

(10) Patent No.: US 7,555,517 B2
(45) Date of Patent: Jun. 30, 2009

(54) ACQUIRING AND PROCESSING DATA ASSOCIATED WITH AN INCIDENT AMONG MULTIPLE NETWORKED COMPUTING APPARATUSES

(75) Inventors: Barrett Kreiner, Norcross, GA (US); Jonathan Reeves, Roswell, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 816 days.

(21) Appl. No.: 10/987,623

(22) Filed: Nov. 12, 2004

(65) Prior Publication Data

US 2005/0251405 A1    Nov. 10, 2005

Related U.S. Application Data

(60) Provisional application No. 60/567,961, filed on May 4, 2004.

(51) Int. Cl.
*G06F 15/16* (2006.01)
(52) U.S. Cl. .................. 709/203; 709/206; 709/223; 455/520; 379/45; 379/49
(58) Field of Classification Search ............. 709/203, 709/206; 455/520; 379/45, 49
See application file for complete search history.

(56) References Cited

U.S. PATENT DOCUMENTS

| | | | |
|---|---|---|---|
| 6,208,973 B1 * | 3/2001 | Boyer et al. | 705/2 |
| 6,775,356 B2 * | 8/2004 | Salvucci et al. | 379/49 |
| 6,885,874 B2 * | 4/2005 | Grube et al. | 455/520 |
| 7,123,693 B2 * | 10/2006 | Nelson et al. | 379/45 |

* cited by examiner

*Primary Examiner*—Jinsong Hu
(74) *Attorney, Agent, or Firm*—Jennifer Pearson Medlin, Esq.; Morris Manning & Martin LLP

(57) ABSTRACT

Methods, systems, and apparatuses are provided for acquiring and processing incident data among multiple networked computing apparatuses. A method involves provisioning an interface associated with a mode of service of a computing apparatus, receiving incident data via the interface, and analyzing the data received according to rules associated with the mode of service. The interface includes a form for documenting the incident data where the form is compatible with one or more fields capable of being concurrently shared among networked computing apparatuses. The interface may be modified in response to receiving the data where a view of the incident data is based on the mode of service. The method further involves recording the data received and transmitting the data received to one or more other networked computing apparatuses over a wireless network based on a mode of service activated on each of the networked computing apparatuses.

20 Claims, 8 Drawing Sheets

| INCIDENT OBJECTIVES | 1. INCIDENT NAME | 2. DATE PREPARED | 3. TIME PREPARED |
|---|---|---|---|

4. OPERATIONAL PERIOD (DATE/TIME)

5. GERNERAL CONTROL OBJECTIVES FOR THE INCIDENT ( INCLUDE ALTERNATIVES)

6. WEATHER FORCAST FOR OPERATIONAL PERIOD

7. GENERAL SAFETY MESSAGE

8. ATTACHMENTS (CHECK IF ATTATCED)

- ❏ ORGANIZATION LIST (ICS 203)   ❏ MEDICAL PLAN (ICS 206)   ❏ _____
- ❏ ASSIGNMENT LIST (ICS 204)     ❏ INCIDENT MAP             ❏ _____
- ❏ COMMUNICATIONS PLAN (ICS 205) ❏ TRAFFIC PLAN             ❏ _____

| 202 ICS 3-80 | 9. PREPARED BY (PLANNING SECTION CHIEF) | 10. APPROVED BY (INCIDENT COMMANDER) |
|---|---|---|

*Fig. 5A*

| MEDICAL PLAN | 1. INCIDENT NAME | 2. INCIDENT PREPARED | 3. TIME PREPARED | 4. OPERATIONAL PERIOD | |
|---|---|---|---|---|---|
| 5. RESIDENT MEDICAL AID STATIONS ||||||
| MEDICAL AID STATIONS | LOCATION ||| PARAMEDICS ||
| ||||YES|NO|
| | | | | | |
| | | | | | |
| | | | | | |
| | | | | | |
| 6. TRANSPORTATION ||||||
| A. AMBULANCE SERVICES ||||||
| NAME | ADDRESS || PHONE | PARAMEDICS ||
| |||| YES | NO |
| | | | | | |
| | | | | | |
| | | | | | |
| B. INCIDENT AMBULANCES ||||||
| NAME | LOCATION |||| PARAMEDICS |
| | | | | | |
| | | | | | |
| | | | | | |
| 7. HOSPITALS ||||||
| NAME | ADDRESS | TRAVEL TIME || PHONE | HELIPAD | BURN CTR |
| | | AIR | GRND | | YES | NO | YES | NO |
| | | | | | | | | |
| | | | | | | | | |
| | | | | | | | | |
| 8. MEDICAL EMERGENCY PROCEDURES ||||||

| 206 ICS 8-78 | 9. PREPARED BY (MEDICAL LEADER) | 10. REVIEWED BY (SAFETY OFFICER) |
|---|---|---|

| 1. INCIDENT NAME | 2. INCIDENT NO. | INCIDENT STATUS SUMMARY | | | | |
|---|---|---|---|---|---|---|
| 4. TYPE INCIDENT | | 5. LOCATION | | | | |
| 6. CURRENT THREAT | | 7. CONTROL PROBLEMS | | | | |
| 8. CURRENT WEATHER WS TEMP WD RH 602 | 9. PREDICTED WEATHER NEXT PERIOD WS TEMP WD RH 505 | 10. TOTAL COST TO DATE | | | | 604 |
| 11. AGENCIES 12. RESOURCES | 124 | | | | | TOTALS |
| KIND OF RESOURCE | | | | | | |
| ENGINES | | | | | | |
| DOZERS | | | | | | |
| CREWS | | | | | | |
| TRUCK COS. | | | | | | |
| RESCUE/MED. | 120 | | | | | |
| HELICOPTERS | | | | | | |
| TOTAL PERSONNEL | | | | | | |
| 13. COOPERATING AGENCIES | | | | | | |
| 14. REMARKS | | | | | | |
| 15. PREPARED BY | 16. APPROVED BY | | 17. DATE TIME | | | |

*Fig. 6*

ACQUIRING AND PROCESSING DATA ASSOCIATED WITH AN INCIDENT AMONG MULTIPLE NETWORKED COMPUTING APPARATUSES

CROSS REFERENCE TO RELATED APPLICATIONS

The present application claims priority from U.S. provisional application No. 60/567,961 entitled "Networked Incident Command Clipboards and Documentation," filed May 4, 2004, said application incorporated herein by reference.

FIELD OF INVENTION

The present invention relates generally to incident command management systems. More particularly, the present invention relates to acquiring and processing data associated with an incident among multiple networked computing apparatus via wireless links.

BACKGROUND OF INVENTION

Incident Command (IC) is a well-recognized standard for organizing resources during an emergency incident. From single car accidents to large-scale disasters, the amount of information that must be collected to insure the safety of the personnel, equipment, and properties involved can be significant. Various emergency services have developed their own versions of IC including the documentation for data associated with the incident. The type of emergency may alter the documentation needed. The documentation must be of good quality for possible legal use. In previous IC systems, documentation is primarily generated using paper. Documentation and transmission of incident data is critical to the success and safety of an incident response. Some incident data may be written down on paper then translated into some form of a computer entry or radioed verbally. Some information is critical in nature and is needed on a real-time basis. Other information is gathered pre and post task and consolidated later.

Generally, the transmission of incident data is verbal, done via radio. The transfer of incident data and/or paper records regarding the incident is verbally transmitted over a radio where the recipient re-records the incident data on paper. Because the incident data is re-copied over the radio by someone other than the original acquirer of the data, the likelihood of data, context, and efficiency loss is increased.

Coordinating the efforts of individual agencies or groups as they work toward the common goal of stabilizing the incident and protecting life, property, and the environment can be a complex challenge. Time is of the essence during an incident, and many manual calculations that affect safety are based on the information collected. Further, certain events during an incident, such as safety notifications, are needed but may interfere with other operations. Any reduction in time to respond to new incident data will likely translate into increased safety and reduction in risk of life. Also, any reduction in errors during the transmission of incident data due to garbled radio communication is another challenge will support increased safety and reduced risk.

Still further, the procedures and protocols of one jurisdiction (e.g. political, geographic, sector, and/or agency jurisdictions) being different from another jurisdiction create a problem when both jurisdictions respond to an incident and must interface with each other. Incident data gathered by the first jurisdiction cannot be transferred to the second jurisdiction without extensive coordination. Because data transmission methods between responding jurisdictions may differ (different radio frequencies assigned, etc), when a situation changes within one sector jurisdiction incident data regarding the change is hindered from being transmitted to another sector jurisdiction for an appropriate type response.

SUMMARY OF THE INVENTION

In accordance with embodiments of the present invention, the above and other problems are addressed by methods, systems, and apparatuses for acquiring and processing incident data among one or more networked computing apparatuses. The networked computing apparatuses may include portable networked tablet clipboards. Embodiments of the present invention particularly relate to an IC management system. A Standard ICMS (Incident Command Management System) is an on-scene emergency management concept specifically designed to allow its user(s) to adopt an integrated organizational structure equal to the complexity and demands of single or multiple incidents, without being hindered by jurisdictional boundaries. ICMS depends upon highly compartmentalized functions or sectors that give or receive orders, perform tasks, and relay information to superiors.

The introduction of wireless technologies allows incident data to flow freely between sectors in an efficient and error-free manner. Coordination of wireless data and radio based transmission assures correct reception and recording of incident data and subsequent proper and/or safe responses to rapidly developing situations. In embodiments of the present invention, the incident data that is transmitted to another sector is basically the incident data that is received with minimal or no distortion. This efficiency and accuracy in data transmission translates into increased safety, improved response time, and better overall performance of an ICMS based response. Further, because data transmission methods between responding jurisdictions may differ, the transmission of data via industry standard methodologies, as disclosed by the present application, alleviates a lack of coordination in critical situations.

One illustrative embodiment provides a method for acquiring and processing data associated with an incident among one or more networked computing apparatuses. The method involves provisioning, via a computing apparatus, an interface associated with a mode of service of the computing apparatus and receiving data associated with the incident via the interface. The incident data received is then analyzed according to rules associated with the mode of service. The interface receiving the incident data may include a form for documenting the incident data. The form is compatible with one or more fields that are capable of being concurrently shared in real time among networked computing apparatuses. In response to receiving the incident data, the interface may be modified where a view of the incident data is based on the mode of service of the receiving computing apparatus. The incident data received may be recorded onto a memory of the computing apparatus and transmitted to other networked computing apparatuses over a wireless network based on a mode of service activated on each of the networked computing apparatuses receiving the transmission.

Another illustrative embodiment is a system for acquiring and processing data associated with an incident. The system includes a networked computing apparatus operative to provision an interface associated with a mode of service of the networked computing apparatus. The networked computing apparatus is further operative to receive incident data via the interface, analyze the data received according to rules associated with the mode of service, and transmit the data received to one or more other networked computing apparatuses over a wireless network. The interface may include a form for documenting the incident data. The form provides a view of one or more fields where the fields are capable of being shared among the networked computing apparatuses in real time.

The fields may or may not be associated with a master spreadsheet supplying data to a variety of documents. The networked computing apparatus may also include a paper backup system to facilitate continued data collection and communication should the computing apparatus fail.

The system may further include a server computer operative to receive the incident data transmitted from the computing apparatus. The server computer is also operative to transmit and receive data associated with the incident over the Internet, a satellite network, and/or a network in a different radio frequency (RF) jurisdiction than the computing apparatus. The server computer is still further operative to record the data and the other data received onto a memory of the server computer and transmit the other data to at least one computing apparatus.

Still another illustrative embodiment is an apparatus for acquiring and processing data associated with an incident. The apparatus comprises a tablet-based computer that includes a processor, a memory in communication with the processor, a touch screen in communication with the processor. The tablet-based computer also includes a pen input apparatus and a handwriting digitizer in communication with the processor for entering and receiving the data via the touch screen. A rechargeable battery supplies power to the tablet-based computer. The tablet-based computer also includes a line-in and a line-out, in communication with the processor, which are compatible with radio standards. The tablet-based computer may further include an audio recorder in communication with the memory for recording audio messages received over the line-in and speakers in communication with the processor for playing back the messages received. Still further the tablet-based computer includes a wireless network interface in communication with the processor. The apparatus further includes a compartment integrated with a housing of the tablet-based computer. The compartment may store office supplies including paper for a paper backup system and a clipping member in pivotable contact with the housing for clipping the paper to a surface of the tablet-based computer in support of writing.

The tablet-based computer may further include a computer program executing in the memory, configured to provision an interface displayed via the touch screen and associated with a mode of service of the networked computing apparatus. The computer program is further configured to receive the incident data via the interface, analyze the data received according to rules associated with the mode of service, and transmit the data received to one or more other networked computing apparatuses over a wireless network and/or the line-out compatible with radio standards. The interface may include a form document compatible with one or more fields where the fields are shared among the networked computing apparatuses in real time.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 5A-5B illustrate form documents utilized in an illustrative embodiment of the invention as an interface for the tablet-based computer clipboard of FIG. 2;

FIG. 6 illustrates a form document utilized in an illustrative embodiment of the invention as an interface for the tablet-based computer clipboard of FIG. 2.

DETAILED DESCRIPTION OF DISCLOSED EMBODIMENTS

Figure 1:
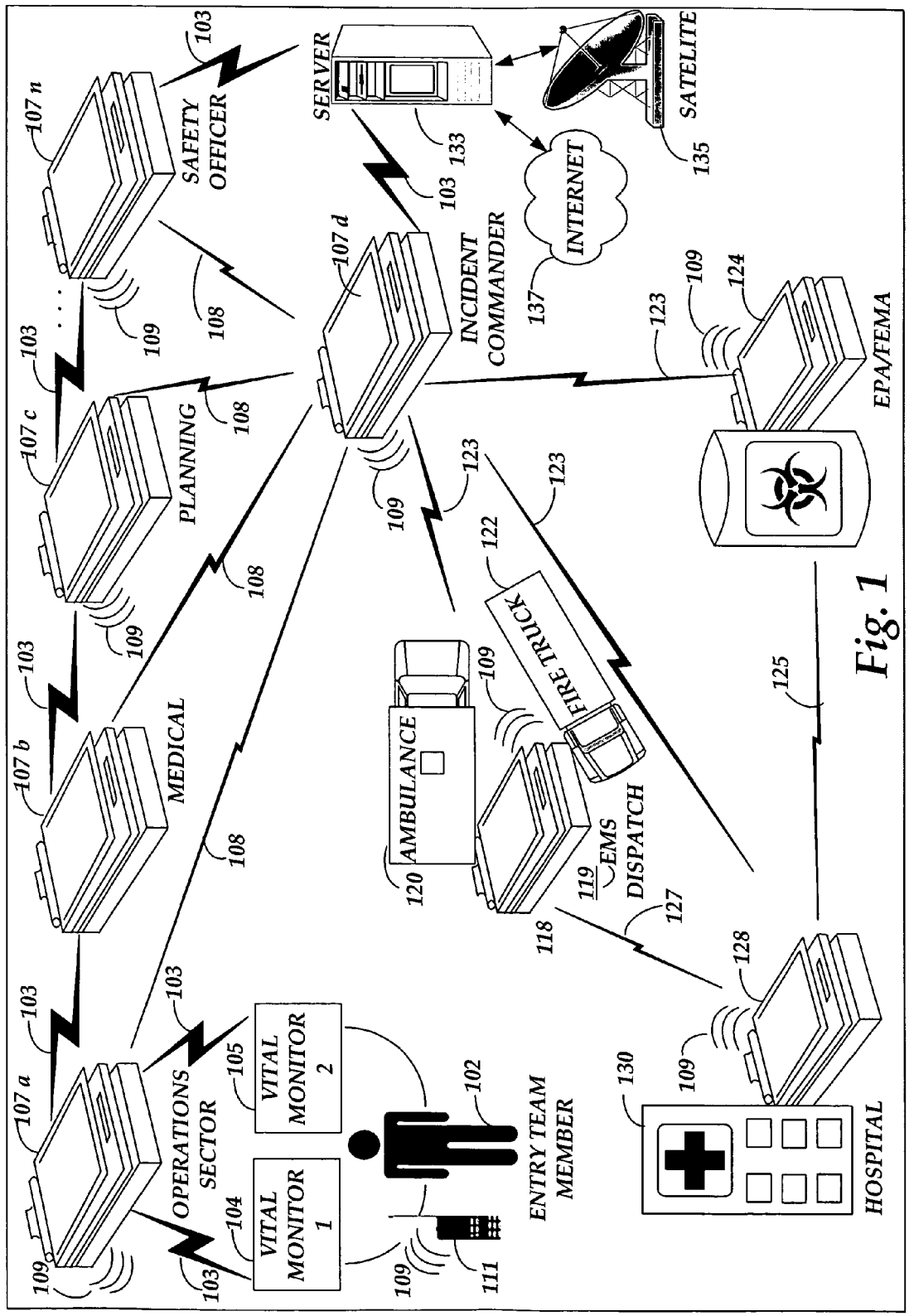
FIG. 1 illustrates a networked and wireless operating environment for illustrative embodiments of the present invention that allow a portable computing apparatus to receive and transmit incident data over a wireless link to one or more other networked computing apparatuses.

As described briefly above, embodiments of the present invention provide methods, systems, and apparatuses for acquiring and processing incident data among one or more networked computing apparatuses. In the following detailed description, references are made to accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Referring now to the drawings, in which like numerals represent like elements through the several figures, aspects of embodiments the present invention and the exemplary operating environment will be described. FIGS. 1-4 and the following discussion are intended to provide a brief, general description of a suitable computing environment in which the embodiments of the invention may be implemented. While the disclosed embodiments will be described in the general context of program modules that execute to acquire and process incident data among one or more networked computing apparatuses via wireless links, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a networked and wireless operating environment for illustrative embodiments of the present invention that allow a portable computing apparatus to receive and transmit incident data over wireless links to one or more other networked computing apparatuses will be described. For the purposes of describing this invention an incident includes, but is not limited to, an occurrence, caused either by human action or natural phenomena, that requires action by emergency service personnel to prevent or minimize loss of life or damage to property and/or natural resources. As shown in FIG. 1, the operating environment includes networked portable computing apparatuses, such as tablet-based computer clipboards 107a-107n, which may receive incident data to be analyzed and/or transmitted among or between the computer clipboards 107a-107n via wireless links. For instance, the computer clipboard 107d may receive an input associated with an incident, such as the name of the incident or the incident commander on duty. The computer clipboard 107d receives inputs according to a mode of service designated for the computer clipboard 107d. In this case the designated mode of service is incident command. This input may be received from another networked computing apparatus and/or via an input from a user, such as an Incident Commander, using a tablet pen 204 (see FIG. 2) to write on an interface of the computer clipboard 107d. The incident commander is the individual responsible for the management of all incident operations at the incident site.

In response to receiving the incident data, the computer clipboard 107d records the data and transmits the data to other networked computer clipboards based on the mode of service designated for each of the other computer clipboards. For instance, the computer clipboard 107d may record the incident name in a field that is capable of being shared with the other computer clipboards 107a-107n in real-time via a wireless peer-to-peer network link 103. Each computer clipboard 107 presents a view of the incident data contained in the shared fields based on the mode of service designated for the computer clipboard 107 presenting.

Referring now to the computer clipboard 107a designated with an operations sector mode of service another example will be described. The operations sector is responsible for all tactical operations at an incident. The operations sector includes branches, divisions and/or groups, task forces, strike or entry teams, single resources and, staging areas. The computer clipboard 107a may receive incident data directly from vital monitors 104 and 105 that monitor the vital signs of an entry team member or responder 102 executing an assignment. The vital monitors may include, but are not limited to, blood pressure cuffs, a pulse oximeter that reads the oxygen level in the responder's blood, a thermometer that reads the core temperature of the responder's body, and a self-contained breathing apparatus monitor. The vital monitors 104 and 105 measure and transmit vital-sign data over a peer-to-peer network link 103 to the operations computer clipboard 107a. In turn the computer clipboard 107a transmits the vital-sign data to the computer clipboards 107a-107n and a server computer 133 via the peer-to-peer network link 103. The computer clipboard 107b, designated with a medical sector mode of service, records the incident data and analyzes the data for any abnormalities.

When abnormalities are determined at the medical sector computer clipboard 107b, such as vital signs that are out of specification, the computer clipboard 107b transmits a result of the analysis to the computer clipboard 107d having the incident command mode of service. An example of a result is a message denoting that the entry team member's 102 air consumption is too high after being exposed to a harmful chemical and a prompt requesting whether Incident Command desires to allow the entry team member 102 to remain available or be removed from service. The computer clipboard 107b directly transmits this message to the computer clipboard 107d over a wireless network link 108. In turn, upon an entry denoting a desire to remove the entry team member 102 from service, the computer clipboard 107d wirelessly informs the computer clipboards 107 having a mode of service to which the resulting message is pertinent. For example, the computer clipboard 107d transmits the resulting message to the computer clipboard 107a so that operations is notified to remove the team member 102 and the computer clipboard 107c having a planning mode of service designation also receives the resulting message so the planning sector is informed that the operations sector is losing an entry team member for a certain period of time.

Also, depending on how serious the vital abnormalities are, the computer clipboard 107d may actually notify the computer clipboard 107n having a safety officer mode of service designation. The Safety Officer is a member of the Command Staff responsible for monitoring and assessing safety hazards or unsafe situations and developing measures for ensuring personnel safety. It should be appreciated that as results of analyzing raw incident data are transmitted to incident command via the wireless network link 108, the raw incident data that supports the results is still being transmitted to all authorized computer clipboards 107a-107n and the server computer 133 via the peer-to-peer network link 103. Still further, the monitored vital-signs may also be presented to a monitoring hospital or emergency room computer clipboard 128 through a gateway such as a wireless link 123 via the incident command computer clipboard 107d or the Internet 137, and/or a satellite network 135 via the server computer 133. A gateway is utilized to overcome complications in communication with jurisdictions that differ from that of the computer clipboards 107a-107n. As the measured vital signs are presented providing the symptoms to the monitoring hospital clipboard 128, a prompt is also given asking "what is a national medical directive review of these symptoms and do we need to dispatch an ambulance".

Once the computer clipboard 107d receives an answer recommending dispatch of an ambulance, the mode of service protocol designated for the Incident Commander computer clipboard 107d instructs the clipboard 107d to notify the ambulance service. The computer clipboard 107d may notify an EMS dispatching center 119 via radio or over a wireless link. An ambulance 120 or an EMS-equipped fire truck 122 is dispatched with an EMS dispatch computer clipboard 118 to the incident scene. The vital-signs and other incident data have already been transmitted to the dispatching center and the EMS clipboard 118. Thus, the ambulance 120 knows that the entry team member 102 has been exposed to a harmful chemical and is now consuming excessive oxygen.

In the event the hospital does not have a clipboard, the information may be translated by some aspect of the system to a medium the hospital can consume such as a TTS radio call to the hospital notifying them of an incoming patient, a fax containing a printout of the patient's history and vital statistics to date. The clipboard 118 could travel with the patient to the hospital, where information may continue to be collected, but may not be able to be transmitted back to the network. A local network modem at the hospital may be used to tie the clipboard 118 back to the incident network, which would then provide any additional pertinent information to the clipboard 118. Thus, the local clipboard 118 could supply any hospital-acquired data, such as patient status, back to the Incident network. Additionally, with the clipboard 118 now "bridged" back to the Incident network, the clipboard 118 can represent a new and potentially more optimal information path to the hospital and any responders that participated in patient delivery.

Further, anytime a responder goes down during a hazardous materials incident dealing with harmful chemicals, mode of service protocols require that assisting agencies such as the Environmental Protection Agency (EPA) and/or the Federal Emergency Management Agency (FEMA) be involved because an injury occurred as a result of a spill. Thus, the hospital clipboard 128 is in communication with the EMS clipboard 118 and an EPA and/or FEMA clipboard 124 to receive recommendations from experienced entities such as the EPA. Information concerning successful prior treatments for harmful chemicals may also be transmitted from the hospital to the EPA/FEMA. This particular example illustrates how the lowest level medical sector filtered all the way up through the higher levels, such as the hospital 130 or FEMA. Each scenario may have a different set of clipboards and notifications in each chain. Cooperating agencies such as the Red Cross may also enter the communications chain to offer services.

It should be appreciated that the clipboards 128, 118, and 124 are similar in design physically to the clipboards 107a-107n, yet they have a different set of programs and belong to a different communications jurisdiction. For example, the clipboard 118 has an ambulance program, the hospital clipboard 128 has a doctor program, and the agency clipboard 124 has an agency program. The information as it comes from the vital monitors 104 and 105 is transmitted to the medical sector clipboard 107b and eventually is transmitted to the hospital, agency, and/or EMS clipboards 128, 124, and 118, respectively.

In another scenario, the responder 102 may need to communicate via a radio 111 and a signal 109 with his direct supervisor who has the operations clipboard 107a. The radio 111 may be used by the responder 102 to participate in personnel accountability reporting (PAR). Incident command protocol requires individuals be associated with one and only one sector. Every 20 minutes per standards, a call for a PAR is conducted where every single person is to respond back to their particular commander. In previous systems a large incident PAR could actually take 10 minutes. However, when using a system according to the present invention, after an initial verbal response back, the clipboards 107a-107n take over. Once the responder 102 acknowledges the PAR request to the supervisor over the radio 111, the supervisor enters incident data into the clipboard 107a indicating that the responder's 102 location is still known to the supervisor. Further, once all of that supervisor's direct reports have checked in, his record gets forwarded up to incident command or to his supervisor. Thus, during PAR, the actual verbal response only takes place once where the individual themselves reports to their sector manager or ordinate. Additional details regarding components involved in acquiring and processing data associated with an incident will be described below with respect to FIGS. 2-4.

Figure 2:
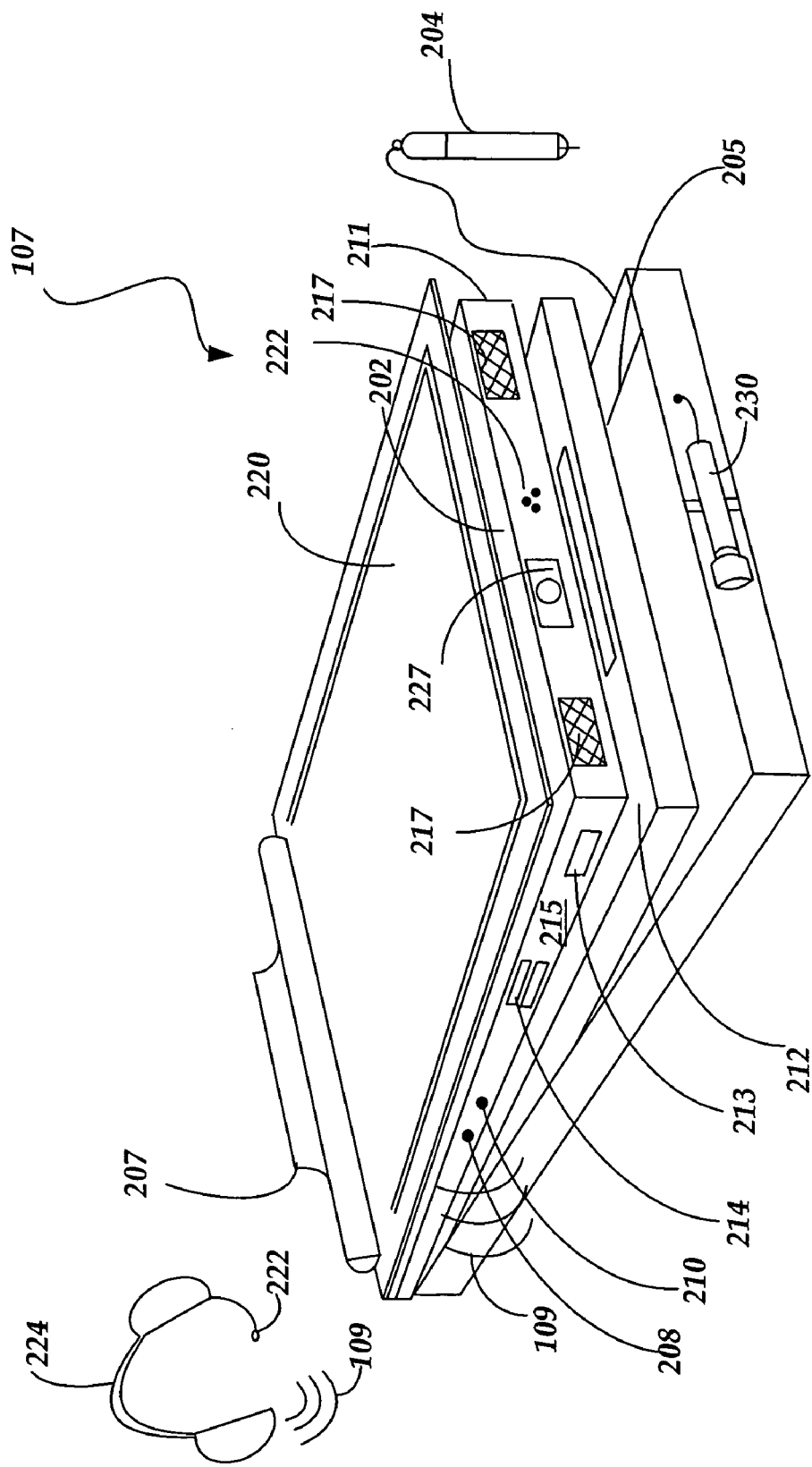
FIG. 2 is a perspective view of a tablet-based computer clipboard having a paper backup system utilized in an illustrative embodiment of the present invention.
Figure 3:
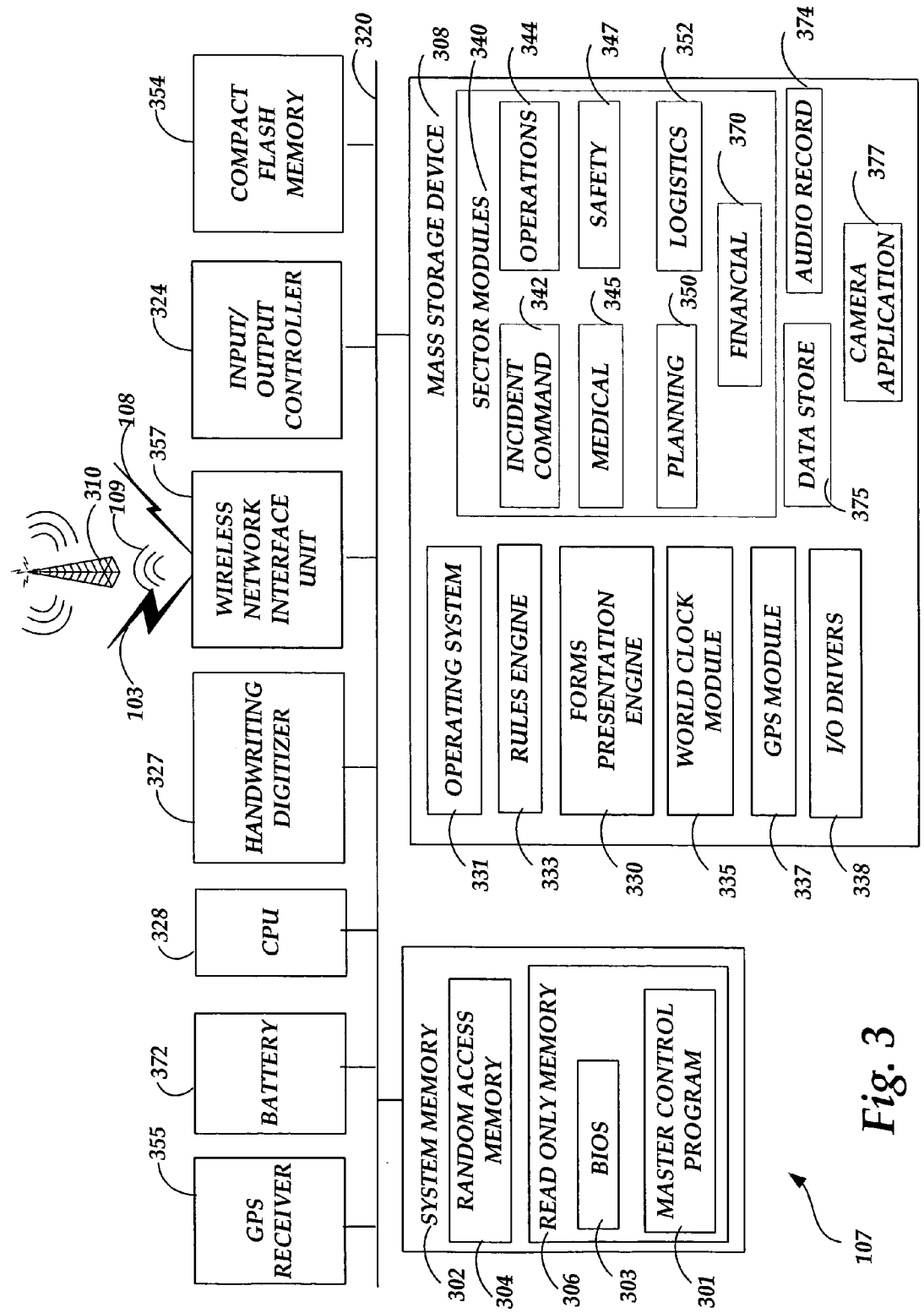
FIG. 3 illustrates computing system architecture for a computing apparatus utilized in illustrative embodiments of the invention.

Turning now to FIGS. 2 and 3, a perspective view of a tablet-based computer clipboard 107 having a paper backup system utilized in an illustrative embodiment of the present invention will be described. As shown in FIGS. 1 and 2, the clipboard 107 is an apparatus for acquiring and processing incident data. The clipboard 107 includes a tablet-based computer 215 having a processor 328, a memory 302 in communication with the processor 328, and a touch screen 202 also in communication with the processor 328. The clipboard 107 also includes the pen input apparatus 204 and a handwriting digitizer 327 in communication with the processor 328 for entering and receiving the data via the touch screen 202. A flip erasable surface 220 in overlay with the touch screen 202 and compatible with the input pen apparatus 204 is also included.

The clipboard 107 also includes line-in 210 and a line-out 208 compatible with radio standards, such as the signal 109, and in communication with the processor 328. The line in 210 may receive audio messages over the radio to be recorded on an audio recorder of the clipboard 107. Once recorded, the messages may be played back for a user to hear. The clipboard 107 further includes speakers 217 in communication with the processor for playing back the messages received and a fixed button 213 for initiating functions including playing and replaying the audio messages received. A microphone 222 interfaced with the audio recorder and USB ports 214 that may be utilized as compact-flash ports and/or secure digital input output ports are also included. Audio communications may also be heard and spoken by a user utilizing a wireless headset 224 with a microphone 222.

The clipboard 107 also includes a compartment 205 integrated with a housing 211 of the tablet-based computer 215. The compartment 205 is for storing office supplies including paper for a paper backup system should the clipboard 107 fail. The clipboard 107 still further includes a clipping member 207 in pivotal contact with the housing 211 for clipping the paper to a surface of the tablet-based computer 215 in support of writing upon the paper. The clipboard 107 also includes a camera 227 in communication with the tablet-based computer 215 and a flashlight member 230 removably attached to the housing 211. Additional details regarding components of the clipboard 107 will be described below with respect to FIG. 3.

FIG. 3 illustrates computing system architecture for a computing apparatus, such as the clipboard 107, utilized in illustrative embodiments of the invention. For the purposes of describing the invention, the clipboard 107 will be used in the description below. The clipboard 107 comprises a tablet-based portable computer that is operative to acquire and process incident data among one or more networked computing apparatuses and includes wireless capability. Wireless capability may be in the form of a wireless network interface unit 357, which may be an RF module transceiver. Alternatively, wireless capability may be built into the clipboard 107 or may be part of a removable PCMCIA or COMPACTFLASH CARD from SANDISK CORPORATION of Sunnyvale, Calif.

The clipboard 107 may be connected to a wireless network 310, via wireless network links 103, 108, and/or 109. The wireless network 310 may be supported by Bluetooth, 802.11, and/or WiMax. It should be appreciated, however, that the clipboard 107 may be configured for communication over other types of networks. Alternatively, the clipboard 107 may comprise another type of computing apparatus operative to access the network 310, such as a handheld computing device, a PDA, and a pocket PC.

The clipboard 107 includes a communications device, such as the wireless network interface unit 357, the central processor 328, the system memory 302, and a system bus 320 that couples the system memory 302 to the central processor 328. The system memory 302 includes read-only memory (ROM) 306 and random access memory (RAM) 304. A basic input/output system 303 (BIOS), containing the basic routines that help to transfer information between elements within the clipboard 107, such as during start-up, is stored in a persistent memory source, such as ROM 306, along with a master control program 301. The master control program 301 provides a set of core operations that are loaded from the persistent memory source and allow the clipboard 107 to configure itself as required by its role or mode of operation. The clipboard 107 further includes a mass storage device (MSD) 308 for storing an operating system 331 such as WINDOWS XP, from MICROSOFT CORPORATION of Redmond, Wash., other applications, such as a rules engine 333, a forms presentation engine 330 for example WORD or EXCEL from MICROSOFT CORPORATION of Redmond, Wash., and a world clock module 335. The MSD 308 may also store a global positioning system (GPS) module 337, and I/O drivers 338. Sector modules 340, in cooperation with the processor 328, are operative to acquire and process incident data among one or more networked computing apparatuses. The sector modules 340 include incident command 342, operations 344, medical 345, safety 347, planning 350, logistics 352, and financial 370. The MSD 308 also stores an audio recorder application 374 and a camera application 377, and a data store 375 for storing the incident data received.

The clipboard 107 also includes a rechargeable battery 372 supplying power, the handwriting digitizer 327, a GPS receiver 355, and compact flash storage 354 in communication with the processor 328 for storing the data received and computer program product. The GPS receiver 355 is in communication with the processor 328 for interfacing with a global positioning satellite and identifying a location of the clipboard 107. The world clock module 335 is in communication with the processor 328 for measuring the duration between incident events and incident notifications, such as PAR.

The MSD 308 is connected to the central processor 328 through a mass storage controller (not shown) connected to the system bus 320. The MSD 308 and its associated computer-readable media, provide non-volatile storage for the clipboard 107. Although the description of computer-readable media contained herein refers to a mass storage device, such as a hard disk or CD-ROM drive, it should be appreciated by those skilled in the art that computer-readable media can be any available media that can be accessed by the CPU 328. The input/output controller 324 may also be included with the clipboard 107 for receiving and processing input from a number of input apparatuses (not shown). The input/output controller 324 communicates with the processor 328 through the system bus 320. It should be appreciated that the clipboard 107 may be without local floppy storage or serial port access.

The central processor 328 may employ various operations, discussed in more detail below with reference to FIG. 7 to provide and utilize the signals propagated between the clipboard 107 and the other computing apparatuses. The processor 328 may store data to and access data from mass storage device 308, such as electronic memory or magnetic storage. Data is transferred to and received from the storage device 308 through the system bus 320. The processor 328 may be a general-purpose computer processor or processor typically used for computing apparatuses. Furthermore as mentioned below, the processor 328, in addition to being a general-purpose programmable processor, may be firmware, hard-wired logic, analog circuitry, other special purpose circuitry, or any combination thereof.

According to various embodiments of the invention, the clipboard 107 operates in a networked and wireless environment, as shown in FIGS. 1 and 2, using logical connections to remote computing apparatuses via wireless communication, such as an Intranet, peer-to-peer, or a local area network (LAN). The clipboard 107 may connect to the wireless link 103 via the wireless network interface unit 357. It should be appreciated that the wireless network interface unit 357 may also be utilized to connect to other types of networks and remote computer systems.

A computing apparatus, such as the clipboard 107, typically includes at least some form of computer-readable media. Computer readable media can be any available media that can be accessed by the clipboard 107. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage apparatuses, or any other medium that can be used to store the desired information and that can be accessed by the clipboard 107.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 4:
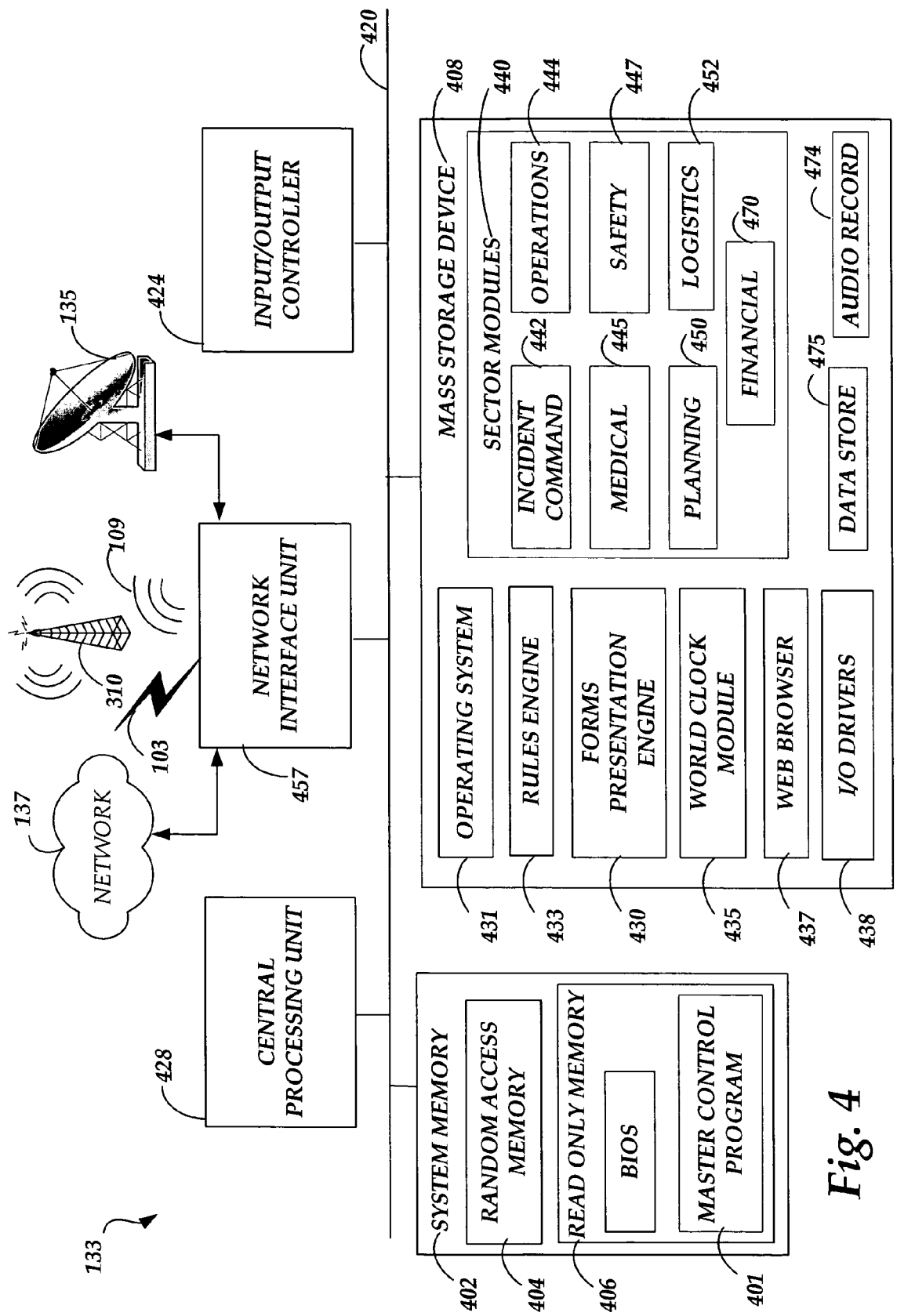
FIG. 4 illustrates a computing system architecture for a server computer utilized in an illustrative embodiment of the invention.

Turning now to FIG. 4, a computing system architecture for a computing apparatus, such as the server computer 133 utilized in embodiments of the invention, will be described. The computer architecture shown in FIG. 4 illustrates a conventional computing apparatus, including a CPU 428 and a system memory 402 containing components described above with respect to FIG. 3. The mass storage device 408 may also store the web browser 437, such as NETSCAPE NAVIGATOR. The mass storage device 408 also stores the operating system 431 and application programs, such as the master control program 401. The server computer 133 may also be operative to execute the Web browser application 437 stored on the mass storage device 408. The server computer 133 also interfaces with networks such as a LAN, WAN, satellite or other type of distributed computing network, such as the Internet that supports the transmission control protocol/Internet protocol ("TCP/IP"). The server computer 133 is basically a peer on the peer-to-peer network, copying all the incident data and results. The server computer 133 also interfaces with multiple jurisdictions with possibly different implementations of the hardware and different radios. Thus, the server 133 will act as a bridge to other systems so that information that's being acquired from a current response team has a consistent framework with a prior response team or a federal unit.

Referring now to FIGS. 1 and 5A-5B form documents utilized in an illustrative embodiment of the invention as an interface for the tablet-based computer clipboard of FIG. 2 will be described. In FIG. 5A, a document 500 is entitled "Incident Objectives". The incident objectives are typically statements of guidance necessary for the selection of appropriate strategies. The incident objectives are usually determined by the Incident Commander. An incident name field 502 and an operational period field 504 are incident data fields that can be utilized on other form documents depending on the mode of service and view of the data a particular clipboard designates. A weather forecast field 505 and a safety message field 507 are both fields along with their contents that may be shared among other networked clipboards 107a-107n or the server 133.

For instance, the safety officer clipboard 107n may receive a safety message from the safety officer that may be transmitted to all clipboards via the peer-to-peer network link 103 or sent via the wireless link 108. Also the weather forecast may be requested from and/or retrieved by the server computer 133 from the Internet 137 or the satellite network 135 and transmitted to the clipboard displaying the document 500 and the weather forecast field 505. The document 500 also has attached documents including a medical plan 511. In the alternative data may be stored and received from a spreadsheet storing the information received by the other networked clipboards 107a-107n or the server 133.

Referring to FIG. 5B and as described briefly above, the fields 502 and 504 may be shared between the document 500 and the medical plan 511. The medical plan may also list the incident ambulance 120 name and the hospital 130 name. A medical emergency field 512 is also available and may be filled in by incident data received from the hospital 130 or assisting agencies such as the EPA.

FIG. 6 illustrates a form document also utilized in an illustrative embodiment of the invention as an interface for the tablet-based computer clipboard of FIG. 2. The document 600 is an Incident Status Summary. As described above with regard to FIGS. 5A and 5B, the incident name field 502 can be shared between the documents. Further, data from the weather forecast field 505 may be used in the document 600. Also, identified agencies 124 and identified rescue vehicles 120 may be transmitted from being previously recorded elsewhere. Still further, a cost-to-date field 604 may be updated based on incident data acquired by a financial clipboard.

Figure 7:
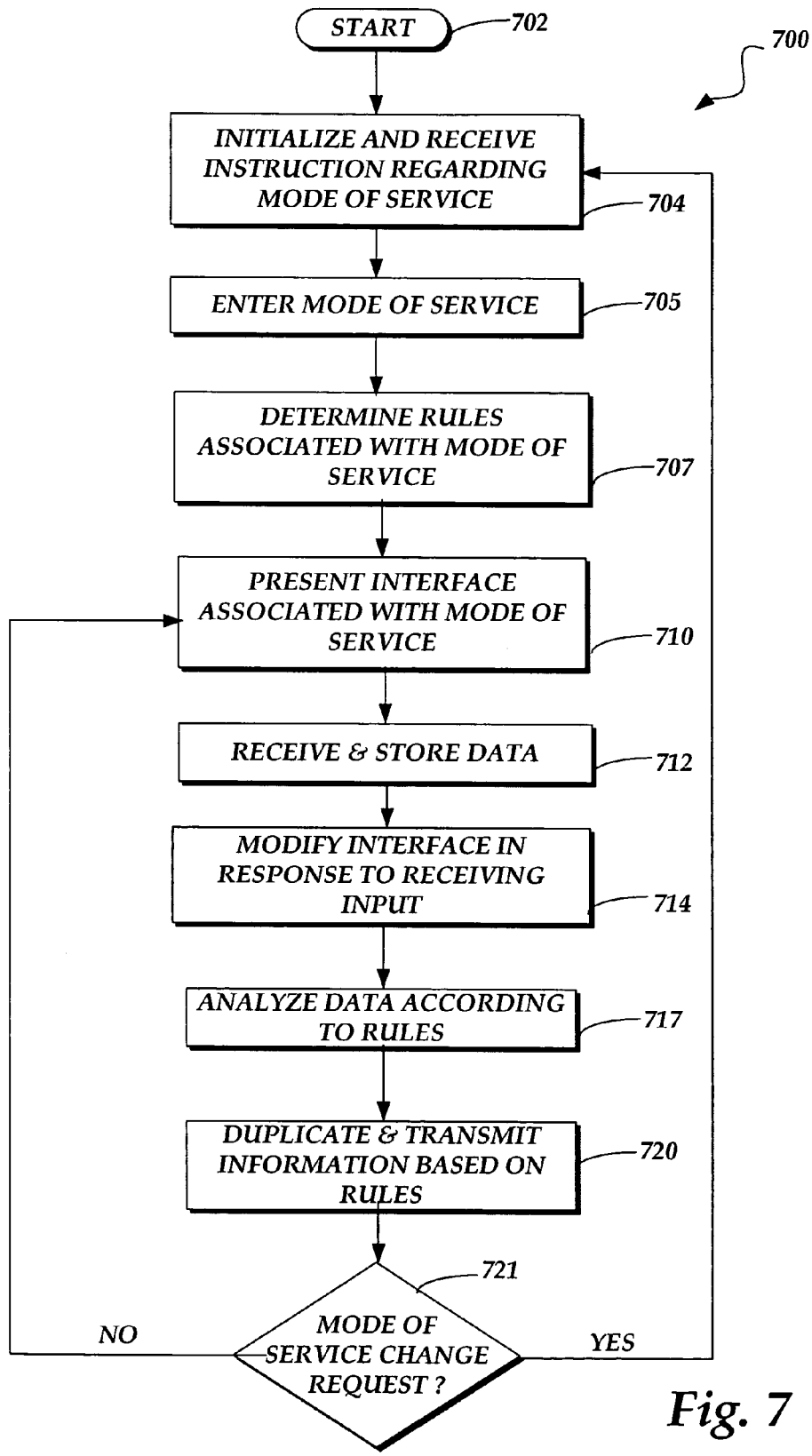
FIG. 7 illustrates an operational flow performed in acquiring and processing incident data among one or more networked computing apparatuses according to an illustrative embodiment of the invention.

Turning now to FIGS. 1, 2, and 7, an illustrative operational flow 700 for acquiring and processing incident data among one or more networked computing apparatuses according to an illustrative embodiment of the present invention will be described. It should be appreciated that the number of clipboards 107a-107n may vary and may be in use or on standby without being interrupted by incident data entry or transmission operations. For instance, other clipboards may operate in a logistics or financial sector mode of service. Exceptions that may interrupt normal operations include PAR or emergency broadcast, such as a "All Hands Back Out". It should also be appreciated that because not all jurisdictions/agencies may have wireless data support, the clipboards 107a-107n are able to continue to acquire data from the environment/responder in a disconnected (offline) mode. When any one of the clipboards 107a-107n can connect back up to the incident network, either wireless or wireline, it can synchronize it's data with the current state of the network.

The operational flow begins at start operation 702 where a computing apparatus, such as the clipboard 107d is started. The operational flow 700 then continues to operation 704 where the clipboard 107d is initialized and receives an instruction regarding the mode of service to enter. In this case, the mode of service for the clipboard 107d is 'Incident Command'. It should be appreciated that each of the clipboards 107a-107n can operate in any mode of service available to the incident command team upon receiving the designation. Some designations, such as incident command, are reserved for use only on a single clipboard unless authorized. For instance, in transition two incident-command clipboards may be authorized to operate in parallel for transition purposes.

Next after receiving the mode of service instruction, the operational flow 700 then continues to operation 705 where the computing apparatus enters the designated mode of service. The operational flow 700 then continues to operation 707 where the rules or protocols associated with the mode of service designated are determined. For example, a rule associated with a medical sector mode of service would be direct notification to incident command when any vital sign measurement becomes abnormal.

The operational flow 700 then continues from operation 707 to operation 710 where an interface associated with the designated mode of service is presented via a touch screen of the clipboard 107d. The interface may be a form document that is compatible with one or more fields capable of being shared among the clipboards 107a-107n. The form document may be of the type as illustrated in FIGS. 5A-6. The interface may also be the radio signal 109 operative to receive information by radio or a wireless link 108 or 103 operative to receive data over a wireless network.

Once the interface is presented, the operational flow continues to operation 712 where incident data is received via the interface and stored onto a memory of the computing apparatus, such as the clipboard 107d. Next, in response to receiving incident data input via the interface, the operational flow 700 continues to operation 714 where the interface is modified or updated with the data input. For example, text written onto the touch-screen 202 with the pen 204 modifies the interface with the incident data inputs received.

The operational flow 700 then continues to operation 717 where the incident data received is analyzed according to the rules associated with the designated mode of service. For example, vital signs received are analyzed according to rules associated with the medical sector mode of service. For instance, there is a rule in the medical sector that says any blood pressure over 160 systolic blood pressure is considered hypertension. Another rule says if a responder has, of the hypertension. Still yet another rule states the safety officer is responsible for transmitting notice of the lost or injured person to the planning sector.

The operational flow 700 then continues to operation 720 where the data and/or the results of the analyzed incident data is duplicated and transmitted to other networked clipboards based on rules associated with a mode of service operating on the clipboards receiving the transmission. Finally, a determination is made at operation 721 as to whether a mode of service change request is active. If a change request is active, the operational flow 700 returns to operation 704 described above. If a change request is not active, the operational flow 700 returns to operation 710 described above.

It should be appreciated that security measures known in the art may be used to prevent unsecured access to data acquisition and update operations. For example, secure digital input/output lines may be utilized and authentication credentials may be implemented and utilized to control security.

Thus, the present invention is presently embodied as methods, systems, computer program products or computer readable mediums encoding computer programs for acquiring and processing data associated with an incident among one or more networked computing apparatuses, such as networked clipboards, via wireless links.

As various changes may be made in the above system elements, software modules and methods without departing from the scope of the invention, it is intended that all matter contained in the above description as shown in the accompanying drawings shall be interpreted as illustrative and not in a limiting sense. Since many embodiments of the invention can be made without departing from the spirit and scope of the invention, the invention resides in the claims hereinafter appended.

What is claimed is:

1. A method for acquiring and processing data associated with an incident among one or more network computing apparatuses, the method comprising:
provisioning via at least one computing apparatus an interface associated with a mode of service of the at least one computing apparatus;
receiving via the interface data associated with the incident; and
analyzing the data received according to rules associated with the mode of service, wherein the rules include sending a notification to an incident command when abnormalities associated with the incident are determined from vital monitors for measuring vital life signs;
wherein the interface comprises a form for documenting the data, the form being compatible with one or more fields which are concurrently shared among the one or more networked computing apparatuses, the one or more field comprising at least one of an incident name field and a safety message field.

2. The method of claim 1, further comprising modifying the interface in response to receiving the data wherein a view of the data associated with the incident is based on the mode of service.

3. The method of claim 1, further comprising:
recording the data received onto a memory of the at least one computing apparatus;
duplicating the data received; and
transmitting the data received to one or more of the networked computing apparatuses over a wireless network based on a mode of service activated on each of the one or more networked computing apparatuses.

4. The method of claim 3, further comprising substantially replicating the data received onto memories of the other one or more networked computing apparatuses.

5. The method of claim 3, wherein transmitting the data received to the one or more other networked computing apparatuses over a wireless network comprised transmitting the data received to one or more computing apparatuses in a different jurisdiction from the at least one computing apparatus utilizing industry standard protocols.

6. The method of claim 5 wherein the computing apparatuses in a different jurisdiction comprise at least one of the following:
a computing apparatus of an emergency medical service;
a computing apparatus of a hospital; and
a computing apparatus associated with at least one of an existing agency and cooperating agency.

7. The method of claim 1, further comprising in response to analyzing the data received according to rules associated with the mode of service, presenting a result of the analysis based on the mode of service.

8. The method of claim 7, further comprising transmitting the result of the analysis to one or more other networked computing apparatuses according to the rules associated with the mode of service.

9. The method of claim 8, wherein the data received comprises data associated with a time-based event, further comprising:
monitoring an internal clock of the at least one computing apparatus from a designated point in time wherein the result transmitted comprises an audio message announcing a time-based event.

10. The method of claim 1, further comprising:
initializing the at least one computing device and receiving a designation regarding a mode of service in which the at least one computing apparatus is to operate;
transitioning to the mode of service designated; and
determining the rules associated with the mode of service designated;
wherein the mode of service comprises the mode of service designated.

11. The method of claim 10, wherein a number of networked computing apparatuses operating in a mode of service designated expands as the incident expands and contracts as the incident contracts and wherein a mode of service is designated from a group including at least one of the following:
medical sector mode of service;
incident command mode of service;
operations sector mode of service;
safety sector mode of service;
communications sector mode of service;
planning sector mode of service;
financial sector mode of service; and
logistics sector mode of service.

12. The method of claim 11 further comprising:
scanning for data associated with the incident that is pertinent to one or more sectors wherein each sector is represented by a mode of service;
detecting the data associated with the incident that is pertinent to the one or more sectors; and
in response to detecting a change in the data associated:
recording the change;
notifying the one or more sector that are pertinent of the change wherein analyzing the data received comprises determining whether the data detected is pertinent to the one or more sectors; and
prompting the one or more sectors that are pertinent to perform an action that is required in response to the change.

13. The method of claim 11 wherein the mode of service comprises one of the medical sector mode of service and the operations mode of service and wherein receiving via the interface data associated with the incident comprises receiving via a wireless interlace vital life sign data from at least one of the following vital-sign monitors:
blood pressure cuffs;
pulse oximeter;
thermometer; and
self contained breathing apparatus.

14. The method of claim 1, further comprising:
determining whether a mode of service change request has been received at the at least one computing apparatus;
in response to determining that the mode of change request has been received, receiving a selection regarding a mode of service to which the at least one computing apparatus is to change; and
transitioning to the mode of service selected.

15. A system for acquiring and processing data associated with an incident, the system comprising:
at least one networked computing apparatus operative to:
provision an interface associated with a mode of service of the at least one network computing apparatus;
receive via the interface data associated with the incident;
analyze the data received according to rules associated with the mode of service, wherein the rules include sending a notification to an incident command when abnormalities associated with the incident are determined from vital monitors for measuring vital life signs; and
transmit the data received to one or more other network computing apparatuses over a wireless network;
wherein the interface comprises a form for documenting the data, the form being compatible with one or more fields which are concurrently shared among the one or more networked computing apparatuses, the one or more fields comprising at least one of an incident name field and a safety message field.

16. The system of claim 15, further comprising:
a server computer operative to:
- receive the data associated with the incident from the at least one computing apparatus;
- transmit the data and receive other data associated with the incident over at least one of an Internet network, a satellite network, and a network in a different RF jurisdiction than the at least one computing apparatus;
- record the data and the other data received onto a memory of the server computer; and
- transmit the other data to the at least one computing apparatus.

17. The system of claim 16, wherein the at least one networked computing apparatus includes a paper backup system and wherein the at least one networked computing apparatus comprises at least one of the following:
- a tablet personal computer;
- a handheld computing device;
- a personal digital assistant (PDA);
- a laptop computer; and
- a pocket personal computer.

18. An apparatus for acquiring and processing data associated with an incident, the apparatus comprising:
a tablet-based computer having:
- a processor;
- a memory in communication with the processor;
- a touch screen in communication with the processor;
- a pen input apparatus and a handwriting digitizer in communication with the processor for entering and receiving the data via the touch screen;
- a rechargeable battery supplying power to the tablet-based computer;
- at least one line in and at least one line out compatible with radio standards and in communication with the processor;
- an audio recorder in communication with the memory for recording audio messages received over the least one line in;
- speakers in communication with the processor for playing back the messages received; and
- a wireless network interface in communication with the processor;
- a compartment integrated with a housing of the tablet-based computer, the compartment for storing office supplies including paper for a paper backup system; and
- a clipping member in pivotal contact with the housing for clipping the paper to a surface of the tablet-based computer in support of writing thereon.

19. The apparatus of claim 18, wherein the tablet-based computer further comprises:
a computer program product executing in the memory, embodied therein, the computer program product configured to:
- provision an interface displaying via the touch screen and associated with a mode of service of the at least one networked computing apparatus;
- receive via the interface the data associated with the incident;
- analyze the data received according to rules associated with the mode of service; and
- transmit data received to one or more other networked computing apparatuses over at least one of a wireless network and the line out compatible with radio standards;
- wherein the interface comprises a form for documenting the data, the form being compatible with one or more fields that are concurrently shared among the one or more networked computing apparatuses.

20. A method for acquiring and processing data associated with an incident among one or more networked computing apparatuses, the method comprising:
- provisioning via at least one computing apparatus an interface associated with a mode of service of the at least one computing apparatus;
- receiving via the interface data associated with the incident;
- analyzing the data receiving according to rules associated with the mode of service, wherein the interface comprises a form documenting the data, the form being compatible with one or more fields capable of being concurrently shared among the one or more networked computing apparatuses;
- initializing the at least one computing device and receiving a designation regarding a mode of service in which the at least one computing apparatus to operate;
- transitioning to the mode of service designated;
- determining the rules associated with the mode of service designated, wherein the mode of service comprises the mode of service designated;
- wherein a number of networked computing apparatuses operating in a mode of service designated expands as the incident expands and contracts as the incident contracts and wherein a mode of service is designated from a group including at least one of the following:
  - medical sector mode of service;
  - incident command mode of service;
  - operations sector mode of service;
  - safety sector mode of service;
  - communications sector mode of service;
  - planning sector mode of service;
  - financial sector mode of service; and
  - logistics sector mode of service;
- scanning for data associated with the incident that is pertinent to one or more sectors, wherein each sector is represented by a mode of service;
- detecting the data associated with the incident that is pertinent to the one or more sectors; and
- in response to detecting a change in the data associated:
  - recording the change;
  - notifying the one or more sectors that are pertinent of the change wherein analyzing the data received comprises deterring whether the data detected is pertinent to the one or more sectors; and
  - prompting the one or more sectors that are pertinent to perform an action that is required in response to the change.

* * * * *